United States Patent [19]

Springer

[11] 4,037,351
[45] July 26, 1977

[54] APPARATUS FOR ATTRACTING AND ELECTROCUTING FLIES

[76] Inventor: Charles H. Springer, Rte. 1, Box 327, Alta Loma, Tex. 77510

[21] Appl. No.: 640,476

[22] Filed: Dec. 15, 1975

[51] Int. Cl.² .............................................. A01M 1/22
[52] U.S. Cl. ...................................................... 43/112
[58] Field of Search .......................................... 43/112

[56] References Cited

U.S. PATENT DOCUMENTS

| 1,823,892 | 9/1931  | Galbraith     | 43/112 |
|-----------|---------|---------------|--------|
| 1,972,180 | 9/1934  | Bowman        | 43/112 |
| 1,981,951 | 11/1934 | Folmer        | 43/112 |
| 2,465,574 | 3/1949  | Brown et al.  | 43/112 |
| 2,835,071 | 5/1958  | Partridge     | 43/112 |

Primary Examiner—Russell R. Kinsey
Assistant Examiner—Daniel J. Leach
Attorney, Agent, or Firm—Carlos A. Torres; E. Richard Zamecki

[57] ABSTRACT

In accordance with an illustrative embodiment of the invention disclosed herein, an apparatus for electrocuting insects, particularly flies, includes an open-topped but otherwise enclosed structure, a grid horizontally disposed near the top of said structure, said grid has a plurality of closely spaced pairs of conductor wires charged to a moderately high potential difference, means for producing over a prolonged period a dry odor that is highly attractive to flies and the like, and means for supplying the odor to, and releasing the odor in, a region within the structure below the grid.

11 Claims, 5 Drawing Figures

APPARATUS FOR ATTRACTING AND ELECTROCUTING FLIES

This invention relates generally to an apparatus for electrocuting insects of various kinds, and particularly to a new and improved insect electrocuting apparatus that includes means for attracting particularly bothersome insects, such as flies, to pass between spaced, electrically charged grids.

Various devices for electrocuting insects, and thereby exterminating them in large numbers, are known. Most all such devices comprise electrically charged grids arranged so that an insect passing through the grids momentarily closes a circuit and is subjected to destructive current. In order to lure insects through the grid, various devices such as lights and bait have been proposed. However, some of the more obnoxious and offensive insects, such as flies, are not particularly attracted to a light, and even are somewhat sensitive to, and wary of, the electric field that is set up around some prior art grid arrangements. However, it will be appreciated that flies are almost irresistably attracted to certain types of odors, and I have taken advantage of this fact in making the invention disclosed and claimed herein.

One object of the present invention is to provide a new and improved insect electrocuting apparatus.

Another object of the present invention is to provide a new and improved insect electrocuting apparatus that is particularly useful in the destruction of flies.

Still another object of the present invention is to provide a new and improved insect electrocuting apparatus including a unique odor producing means for luring particularly offensive insects such as flies to the apparatus.

These and other objects are attained in accordance with the concepts of the present invention through the provision of an apparatus comprising an open-topped frame having bottom and side walls and a grid formed of adjacent pairs of closely spaced, electrically charged conductors that normally form an open circuit. However, when an insect such as a fly passes through the space between a conductor pair, its body momentarily completes a circuit and subjects the fly to a destructive current, whereupon the fly falls and reposes on the bottom wall of the frame. In order to lure flies through the grid, an odor is produced and continuously released in a region below the grid. In accordance with a principal feature of this invention, the odor is generated in a closed container that holds a liquid having a decayable substance immersed therein. The liquid is aerated and agitated by suitable means in order to concentrate a region of dry odor within the container above the liquid. A conduit is employed to convey the dry odor from the top of the container into the frame where the odor is released in the area below the grid. In this manner, a fly most anywhere in the vicinity will be irresistably lured to the frame and through the grid, and to its destruction. In accordance with another feature of the present invention, the grid is charged to a potential below that which will produce an electric field to which flies appear sensitive and are repelled.

The present invention has other objects, features and advantages which will become more clearly apparent in connection with the following detailed description of a preferred embodiment, taken in conjunction with the appended drawings, in which.

Figure 1:
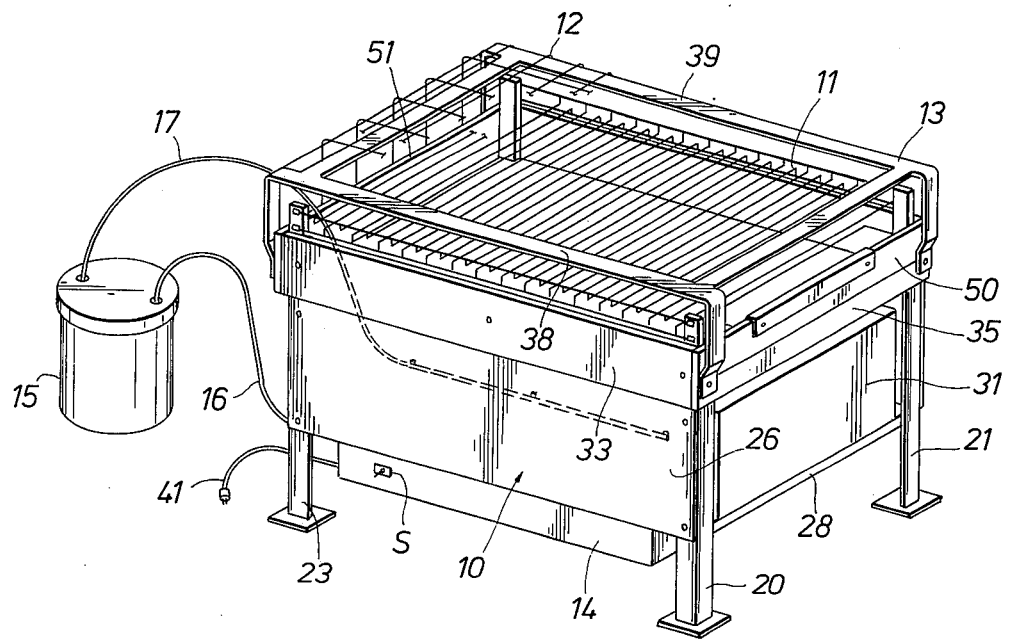
FIG. 1 is an isometric view of the exterior of the apparatus of the present invention.

Referring initially to FIG. 1, an insect electrocuting apparatus in accordance with the present invention includes a box-like structure 10 having side and bottom walls and an open top. An electrically operated grid assembly 11 is supported in a horizontal position on top of the structure 10, and may be guarded, if desired, by a cover of wire mesh 12 that rests on a frame 13. The grid assembly 11, as will be described in greater detail hereafter, comprises a plurality of parallel conductor wires that are spaced fairly closely together, with adjacent pairs of wires charged to a moderately high potential difference by electrical circuitry that can be located in an enclosure 14 that is attached to the bottom of the structure. Standing close by is a closed container 15 partially filled with water in which is immersed an odor forming substance. The output of an air pump is connected by a small flexible hose 16 to the interior of the container where the end of the hose extends to a point near the bottom thereof. Another flexible hose 17 leads from an area within the container 15 above the water therein into a region within the structure 10 below the grid assembly 11, where the odor produced within the container is released at one or more points to attract insects such as flies to come from the surrounding area through the grid assembly.

Figure 2:
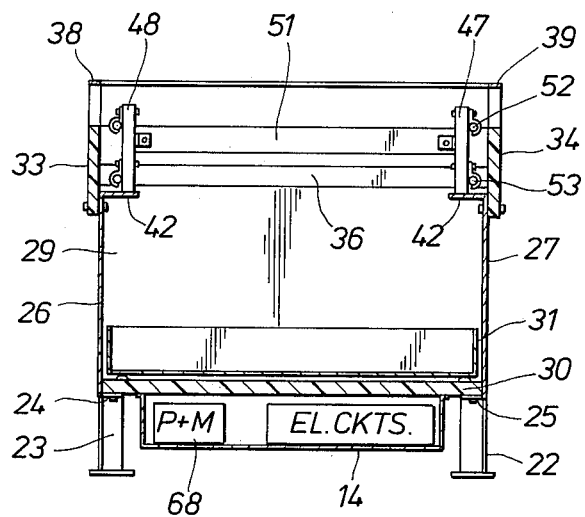
FIG. 2 is a sectional view of the enclosure of FIG. 1.

As illustrated in detail in FIGS. 1 and 2, the open topped structure 10 may be formed for convenience of assembly and structural integrity by angle-iron corner legs 20–23 joined on the longer sides by metal straps 24 and 25 (FIG. 2). The sides are closed in by plates 26 and 27 of galvanized sheet metal, as are the ends at 28 and 29. The bottom preferably is formed by a slab of synthetic marble 30 that rests on top of the straps 24 and 25 and is connected thereto by bolts. One end wall 28 of the structure may be provided with a rectangular opening through which is inserted a metal drawer 31 to facilitate the ready removal of insect bodies that accumulate therein. The upper perimeter of the structure preferably is formed by strips of synthetic marble 33 and 34 along the sides, and narrower strips 35 and 36 along the ends. A guard against anything other than insects flying through the grid assembly 11 from being subjected to electrical shock may be provided by a framework of metal laths 38 and 39 along each side having bent end portions attached by bolts extending through the end strips 35 and 36 of synthetic marble and the leg members 20–23, over which is fitted the hood of wire mesh 12. A galvanized metal box 14 may be suspended underneath the bottom wall 30 of the enclosure to provide a convenient housing for the air pump and the electrical circuits in a place protected from the elements of an outdoor environment. A power cord 41 leads to the interior of the box 14 for providing electrical current to the various components therein via an on-off switch S on the side of the box.

Figure 3:
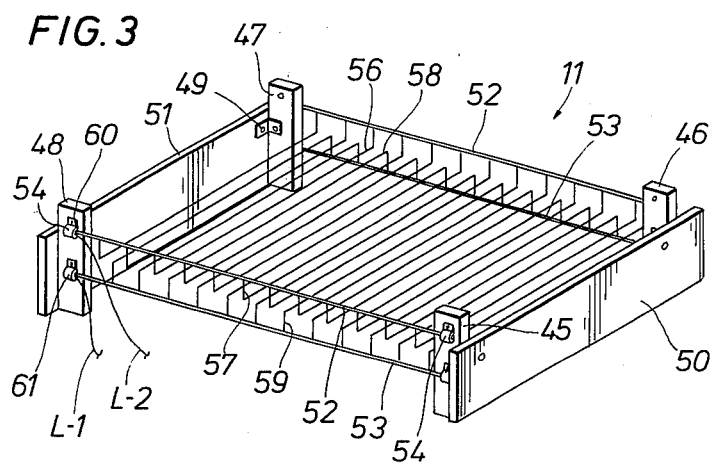
FIG. 3 is another isometric view of only the grid assembly.

As shown to some extent in FIG. 1, and removed for further illustration in FIG. 3, the grid assembly 11 includes corner posts 45–48, again of synthetic marble or other non-conducting material, connected by L-shaped brackets 49 to upper end pieces 50 and 51 of like material that fit above the narrow end pieces 35 and 36 when assembled to complete the upper perimeter of the structure 10. The corner posts 45–48 may be arranged to rest upon shelves 42 that are formed by inwardly turned portions of the sides 26 and 27. Upper and lower stiff metal rods 52 and 53 extend parallel to each other between each side pair of corner posts, and the end portion of each rod is fixed to a respective post by a clamp 54 that is secured by a bolt 55. A plurality of spaced apart conductive wires 56 extend between the two upper rods 52, with each wire having vertical end portions 57 of a length to position the traverse of the wire in a horizontal plane spaced equidistant between the upper and lower rods 52 and 53. In the same manner, wires 58 extend between the two lower rods 53 and are provided with vertical portions 59 to position the horizontal traverse of each wire in the same plane. Moreover, the end portions of the wires 56 are attached to the upper rods 52 at points offset from the points of attachment of the end portions 57 of the wires 58 to the lower rods 53 one half the spacing distance between the wires 58 to provide a composite grid of substantially parallel, adjacent and equally spaced pairs of conductors. The spacing between pairs of wires 56 and 58 may be selectively adjusted to ensure equal intervals by loosening the clamps 54 that secure the end portions of the rods 52 and 53 to the posts 45–48 as shown in FIG. 4, sliding the rods along their axes as required, and then tightening the clamps again.

Figure 4:
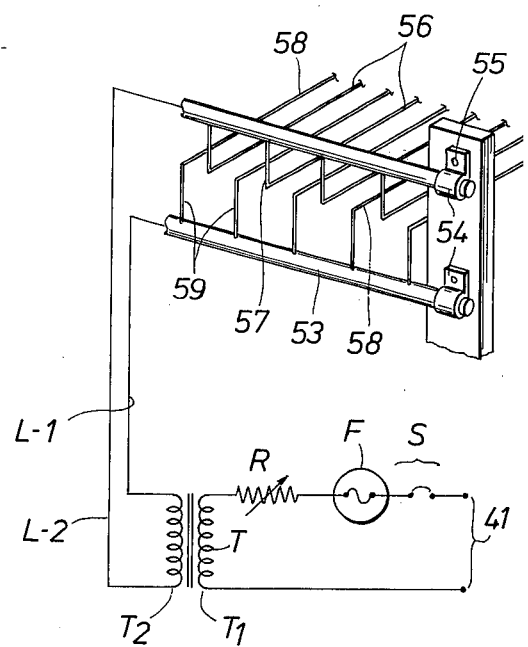
FIG. 4 is an enlarged, fragmentary view of portions of the grid, together with a schematic representation of the electrical circuits used to charge the grid.

Referring still to FIG. 4, adjacent pairs of the conductor wires of the grid assembly 11 are charged to a selected potential difference by an electrical circuit including an on-off circuit breaker overload switch S, a circuit protection means such as a fuse F, and a variable resistance R. A conventional 110 volt, 60 Hz alternating current supply is connected to the input T-1 of a transformer T which provides increased voltage output at the windings T-2. The voltage output from the windings T-2 is supplied to leads L-1 and L-2 which supply the electrical potential to the rods 52 and 53 via connectors 60 and 61 shown in FIG. 3.

Figure 5:
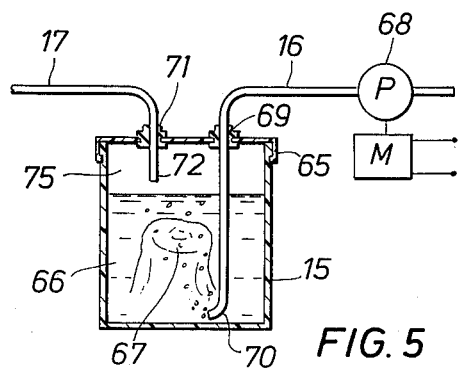
FIG. 5 is a somewhat schematic view of the odor producing and supplying means utilized in the combination of the present invention.

As shown in FIG. 5, an odor producing and supplying means in accordance with a principal aspect of the present invention includes the container 15, of plastic or the like, having a top 65 secured thereto in a leak tight manner. The container 15 is partially filled with water 66, and a decayable, odor forming substance 67 such as a squid is immersed therein. An air pump 68, of the type commonly employed in aerating tropical fish tanks, supplies air to the flexible tube 16 that extends through a sealed fitting 69 in the lid 65 and has its lower end 70 immersed in the water 66. The odor output tube 17 also extends through a lid fitting 71; however the entrance end 72 of this tube is positioned above the level of the water 66. The other end of the tube 17 is led into the open-topped structure 10 as shown in FIG. 1 and is positioned therewithin in a location below the grid assembly 11. One or more odor outlet points may be provided.

In operation, the switch S is turned on to energize both the pump 68 and the electrical circuits, and the latter apply a potential difference to the adjacent pairs of the grid wires 58 and 56. An insect such as a fly which passes between a pair of the wires alters the conductivity of the area therebetween, permitting conduction from one wire to the other through the body of the fly and thereby subjecting it to a destructive electrical current. The odor produced by the decayable substance 67 within the container 15 is concentrated in a region 75 above the water level by the aeration and agitation of the water by the air pump 68. the odor-laden air, under positive pressure due to the action of the pump 68, passes through the tube 17 and is released to the atmosphere in the region below the grid assembly 11. Those skilled in the art will immediately appreciate that flies in the area will come quickly forth and be electrocuted as they pass through the grid assembly 11 toward the point or points of odor discharge.

The aeration and agitation of the water 66 is one important aspect of the present invention. It prevents the formation of a slime or film on the water surface from blocking the transfer of the odor into the open air region thereabove, as well as providing a positive pressure to convey the odor to the points of release. Thus the arrangement ensures that a fly attracting odor will be produced over a prolonged period. Moreover, the odor is concentrated in a dry or fresh form in the area 75 above the water, and is supplied in that condition. This inhibits the accumulation of moisture within the structure 10, which, together with an accumulation of dead fly bodies, might cause short circuits or other malfunction. I prefer to operate the grid wires at a potential difference of about 5000 volts and 30 milliamp current which is quite effective to kill flies, rather than at the higher voltage taught in my U.S. Pat. No. 3,680,251 entitled "Insect Electrocuter". This is because I have found that flies appear to be able to sense the electric field produced near wires operated at such high voltages (12,000 volts), and tend to avoid the area.

It now will be recognized that a new and improved apparatus for electrocuting insects, particularly flies, has been disclosed. Since certain changes or modifications may be made in the apparatus disclosed herein without departing from the scope of the inventive concepts involved, it is the aim of the appended claims to cover all such changes and modifications falling within the true spirit and scope of the present invention.

I claim:

1. Apparatus adapted for use in attracting and electrocuting insects such as flies or the like, comprising: an open-topped but otherwise enclosed hollow structure; grid means mounted horizontally on said structure and having a plurality of pairs of closely spaced conductors; means for electrically charging said pairs of conductors to a potential difference sufficient to subject an insect passing therethrough to a destructive electrical current; and means for producing and then, by positive pumping pressure, releasing in a region below said grid means a dry odor that is effective to attract an insect to pass through said grid means.

2. The apparatus of claim 1 wherein said odor producing means comprises a closed container partially filled with a liquid having an odor forming substance therein, and aerating means for aerating and agitating said liquid in a manner to concentrate a region of dry odor within said container above the surface of said liquid from whence said dry odor is released in said region below said grid means.

3. The apparatus of claim 2 wherein said aerating means comprises an air pump, and conduit means for delivering air from said pump to a location within said container near the bottom thereof where the air bubbles upwardly through said liquid to its surface.

4. The apparatus of claim 3 wherein said odor releasing means comprises conduit means having an inlet opening to the interior of said container above the level of the liquid therein and at least one outlet opening to the interior of said structure below said grid.

5. The apparatus of claim 1 wherein said grid means is substantially rectangular in form and includes upper and lower metal rods extending along opposite sides thereof, said pairs of conductors being formed by a first array of wires extending between said upper rods and a second array of wires extending between said lower rods, said first and second arrays being interleaved and arranged in the same horizontal plane.

6. The apparatus of claim 5 wherein said grid means further includes corner posts made of an electrically non-conducting building material located at the end portions of each of said upper and lower rods, and clamp means for securing said end portions to said corner posts.

7. The apparatus of claim 6 wherein at least some of said clamp means are arranged to be temporarily loosened to enable sliding of said rods along their respective axes to thereby adjust the spacing of adjacent pairs of said wires.

8. The apparatus of claim 1 further including power supply means for supplying a voltage to said conductors that is less than 12,000 volts.

9. The apparatus of claim 8 wherein said voltage is about 5000 volts.

10. Apparatus adapted for use in attracting and electrocuting insects such as flies or the like, comprising: an enclosed hollow structure having an access opening thereinto; grid means mounted on said structure across said access opening and having a plurality of pairs of closely spaced conductors; means for electrically charging said pairs of conductors to a potential difference sufficient to subject an insect passing therethrough to a destructive electrical current; and means for producing and then releasing in a region within said hollow structure a dry odor that is effective to attract an insect to pass through said grid means comprising a closed container partially filled with a liquid having an odor forming substance therein, and aerating means for aerating and agitating said liquid in a manner to concentrate a region of dry odor within said container above the surface of said liquid from whence said dry odor is released in said region within said hollow structure.

11. The apparatus of claim 10 wherein said aerating means comprises an air pump, and conduit means for delivering air from said pump to a location within said container near the bottom thereof where the air bubbles upwardly through said liquid to its surface.

* * * * *